United States Patent
Huang et al.

(10) Patent No.: US 9,323,136 B2
(45) Date of Patent: Apr. 26, 2016

(54) FUNCTION EXPANDING SYSTEM

(71) Applicant: CHICONY ELECTRONICS CO., LTD., New Taipei (TW)

(72) Inventors: Wei-Cheng Huang, New Taipei (TW); Mei-Yi Tsai, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 14/455,835

(22) Filed: Aug. 8, 2014

(65) Prior Publication Data
US 2015/0181105 A1     Jun. 25, 2015

(30) Foreign Application Priority Data
Dec. 24, 2013 (TW) .............................. 102147989 A

(51) Int. Cl.
    *H04N 5/225*        (2006.01)
    *G03B 17/56*        (2006.01)
    *H04N 5/232*        (2006.01)

(52) U.S. Cl.
CPC ............ *G03B 17/561* (2013.01); *H04N 5/2252* (2013.01); *H04N 5/23203* (2013.01); *H04N 5/23206* (2013.01); *H04N 5/23241* (2013.01)

(58) Field of Classification Search
CPC ..... G03B 17/561; G03B 17/563; H04N 5/232
USPC .................................................. 348/373–375
See application file for complete search history.

(56) References Cited

U.S. PATENT DOCUMENTS

2011/0157394 A1*    6/2011    Yoshizumi ................. 348/222.1

* cited by examiner

*Primary Examiner* — Sinh Tran
*Assistant Examiner* — Selam Gebriel
(74) *Attorney, Agent, or Firm* — Blakely, Sokoloff, Taylor & Zafman LLP

(57) ABSTRACT

A function expanding system is provided and includes an image capturing device and a function expanding stand. The image capturing device includes an image capturing module, a device processing module, and a first connecting interface. The device processing module is electrically connected to the image capturing module, and the first connecting interface is electrically connected to the device processing module. The function expanding stand includes a second connecting interface, a stand processing module and a function expanding module. The second connecting interface is removably connected to the first connecting interface. The device processing module sends a control signal to the stand processing module to execute a function. According to the function expanding system, the image capturing device may be paired with different function expanding stands for expanding functions.

12 Claims, 4 Drawing Sheets

FUNCTION EXPANDING SYSTEM

RELATED APPLICATIONS

This application claims priority to Taiwanese Application Serial Number 102147989, filed Dec. 24, 2013, which is herein incorporated by reference.

BACKGROUND

1. Field of Invention

The present invention relates to an expanding system. More particularly, the present invention relates to a function expanding system for an image capturing device.

2. Description of Related Art

When an image capturing device is sold, functions thereof are fixed. If the functions are desired to be expanded, they only can be achieved by modifying internal software or firmware of the image capturing device, but the expansion of functions is limited. Therefore, a user needs to buy a new device to obtain the functions desired. As a result, it costs the user more for expanding the functions.

In a function expanding system of a conventional image capturing device, hardware, software or firmware of the image capturing device have to be modified, thus increasing the cost when expanding the functions. Therefore, how to add a stand to the image capturing device for expanding the functions of the image capturing device through the stand so as to reduce the cost is of the important research topics, and is also a subject that need to be improved in the related field.

SUMMARY

To solve the problem of the conventional skill, one aspect of the invention is to provide a function expanding system.

In one embodiment, the function expanding system provided in the invention includes an image capturing device and a function expanding stand. The image capturing device includes an image capturing module, a device processing module and a first connecting interface. The image capturing module is configured to capture a frame. The device processing module is electrically connected to the image capturing module. The first connecting interface is electrically connected to the device processing module. The function expanding stand includes a second connecting interface, a stand processing module and a function expanding module. The second connecting interface is removably connected to the first connecting interface. The stand processing module is connected to the second connecting interface. The function expanding module is electrically connected to the stand processing module, and is configured to execute at least one function. The device processing module transmits a control signal to the stand processing module to enable the function expanding module to execute the at least one function according to the control signal.

In one embodiment, when the device processing module receives a notification signal of the stand processing module, the device processing module transmits the control signal to the stand processing module according to the notification signal or activates the image capturing module to capture the frame.

In one embodiment, the function expanding module is one or a combination of a button unit, a lighting unit, a display unit, a remote control unit, a temperature and humidity sensing unit, a view angle adjusting unit, and a wireless transmitting unit.

In one embodiment, when the function expanding module is the remote control unit, the remote control unit receives a remote control signal from an external device, and the stand processing module transmits the notification signal to the device processing module according to the remote control signal.

In one embodiment, the image capturing module includes an image lens and an image sensor. The image sensor is configured to capture the frame through the image lens, and output image data to the device processing module. The device processing module performs an image process on the image data.

In one embodiment, the image capturing device further includes a storage module. The storage module is electrically connected to the device processing module, and configured to store the image data that has been processed by the device processing module.

In one embodiment, the image capturing device has a fixed structure, and the function expanding stand has a connecting part. The image capturing device is physically connected to the function expanding stand by jointing the connecting part with the fixed structure.

In one embodiment, the connecting part is physically connected to the fixed structure in a horizontal direction.

In one embodiment, the first connecting interface has contacts, and the second connecting interface has pins. The number of the contacts is equal to the number of the pins, and the contacts are correspondingly connected to the pins.

In one embodiment, the image capturing device further includes a wireless receiving module configured to receive a wireless signal through a network. When the function expanding module is a wireless transmitting unit, the wireless receiving module receives the wireless signal through the network, the device processing module transmits the control signal to the stand processing module, and the stand processing module activates the wireless transmitting unit to control at least one appliance device.

In one embodiment, the function expanding stand includes a power connector and a stand power managing module. The power connector is configured to be connected to an external power source. The stand power managing module is electrically connected to the power connector, the stand processing module and the second connecting interface. When the power connector is connected to the external power source, the stand power managing module converts electricity of the external power source to provide electricity that the stand processing module requires.

In one embodiment, the image capturing device further includes a device power managing module electrically connected to the device processing module. When the power connector is connected to the external power source, the device processing module obtains power from the stand power managing module through the first connecting interface and the second connecting interface. The device processing module provides the power to the device power managing module. The device power managing module performs a power management for the image capturing device.

In one embodiment, the image capturing device is a digital camera, a digital video recorder, or a surveillance camera.

As discussed above, technical solutions of the invention has obvious advantages and beneficial effects compared with the prior art. Significant technical improvements are achieved according to the aforementioned technical solutions which have widespread utility value in the industry. The advantages are adding a stand for the image capturing device, expanding the functions of the image capturing device through the stand, reducing cost, and improving a flexibility of expanding the functions.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are described in detail below in order to make the disclosure more complete and detailed. After understanding the embodiments of the invention, people skilled in the art may change and modify the technology taught by the invention without departing from the spirit and the range of the invention. On the other hand, known components and steps are not described in detail in the embodiments to avoid unnecessary limitation of the invention.

Figure 1:
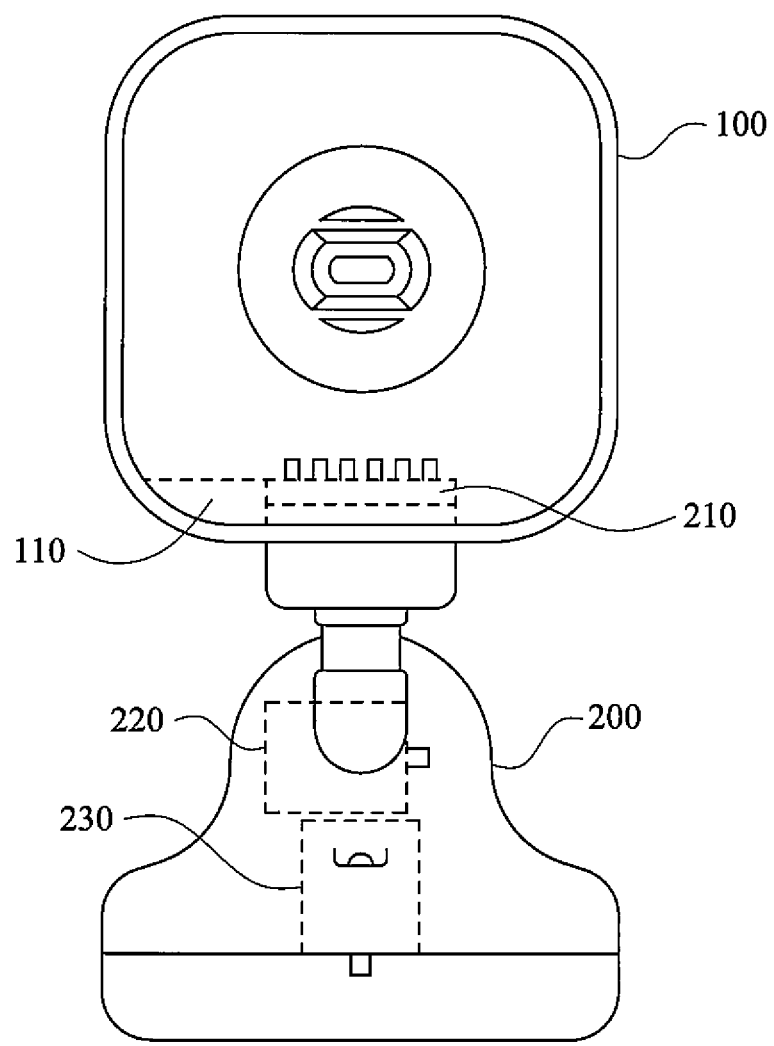
FIG. 1 is a schematic diagram illustrating a connection of a function expanding system according to an embodiment of the invention.

FIG. 1 is a schematic diagram illustrating a connection of a function expanding system according to an embodiment of the invention. In one embodiment, as shown in FIG. 1, the function expanding system includes an image capturing device 100 and a function expanding stand 200. The image capturing device 100 is a device capable of operating independently to capture a frame and store it as an image. After the image capturing device 100 obtains enough power to be activated from an external power source in a charging manner, a user may carry on the image capturing device 100 to capture the frame, and store the frame as an image file. Since the image capturing device 100 has fixed functions, if the image capturing device 100 needs to be expanded to execute other functions, the image capturing device 100 and the function expanding stand 200 can be combined. In addition to being a fixed station of the image capturing device 100, the function expanding stand 200 may also diversify the functions of the image capturing device 100 through a connection. In one embodiment, the image capturing device 100 is a device such as a digital camera, a digital video recorder, or a surveillance camera, which is capable of capturing frames and generating image data. The image data can be stored as an image file or be post-processed. When the image capturing device 100 is jointed with the function expanding stand 200, a capturing angle of the image capturing device 100 can be adjusted through a view angle adjusting unit disposed in the function expanding stand 200. The view angle adjusting unit can be implemented as a tilting motor, a panning motor or a combination thereof based on using requirements. In the present embodiment, the view angle adjusting unit includes a tilting motor 220 and a panning motor 230 to control a view angle of the image capturing device 100 for capturing the frame.

Figure 2:
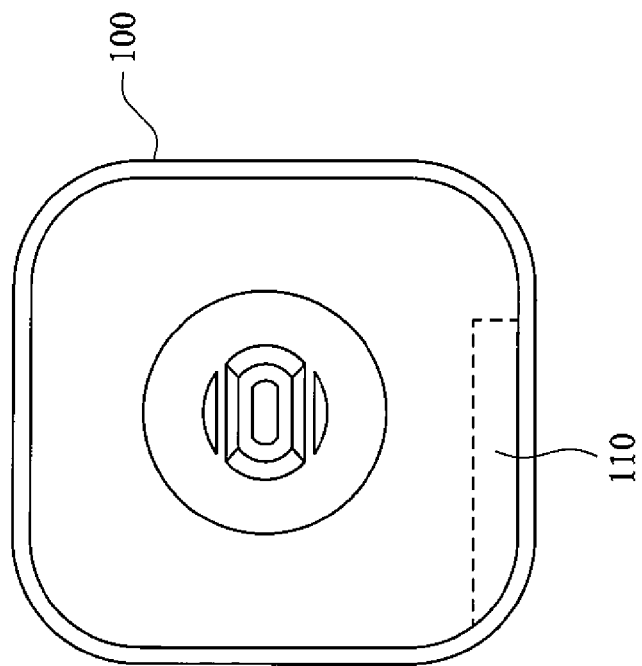
FIG. 2 is a schematic diagram illustrating disassembly of the function expanding system according to an embodiment of the invention.
Figure 2:
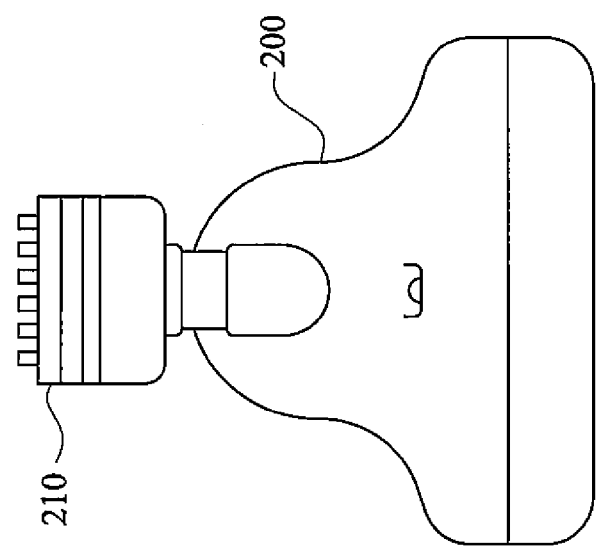

FIG. 2 is a schematic diagram illustrating disassembly of the function expanding system according to an embodiment of the invention. As shown in FIG. 1 and FIG. 2, the image capturing device 100 is removably connected to the function expanding stand 200. In one embodiment, the image capturing device 100 has a fixed structure 110, and the function expanding stand 200 has a connecting part 210. The image capturing device 100 is physically connected to the function expanding stand 200 by jointing the connecting part 210 with the fixed structure 110. For example, the fixed structure 110 can be a sliding groove, and the connecting part 210 can be a connector. The user may connect/detach the image capturing device 100 with/from the function expanding stand 200 through the sliding groove in a horizontal direction based on different using purposes (e.g., carrying on the image capturing device 100, fixing the image capturing device 100 on the function expanding stand 200, etc.)

Figure 3:
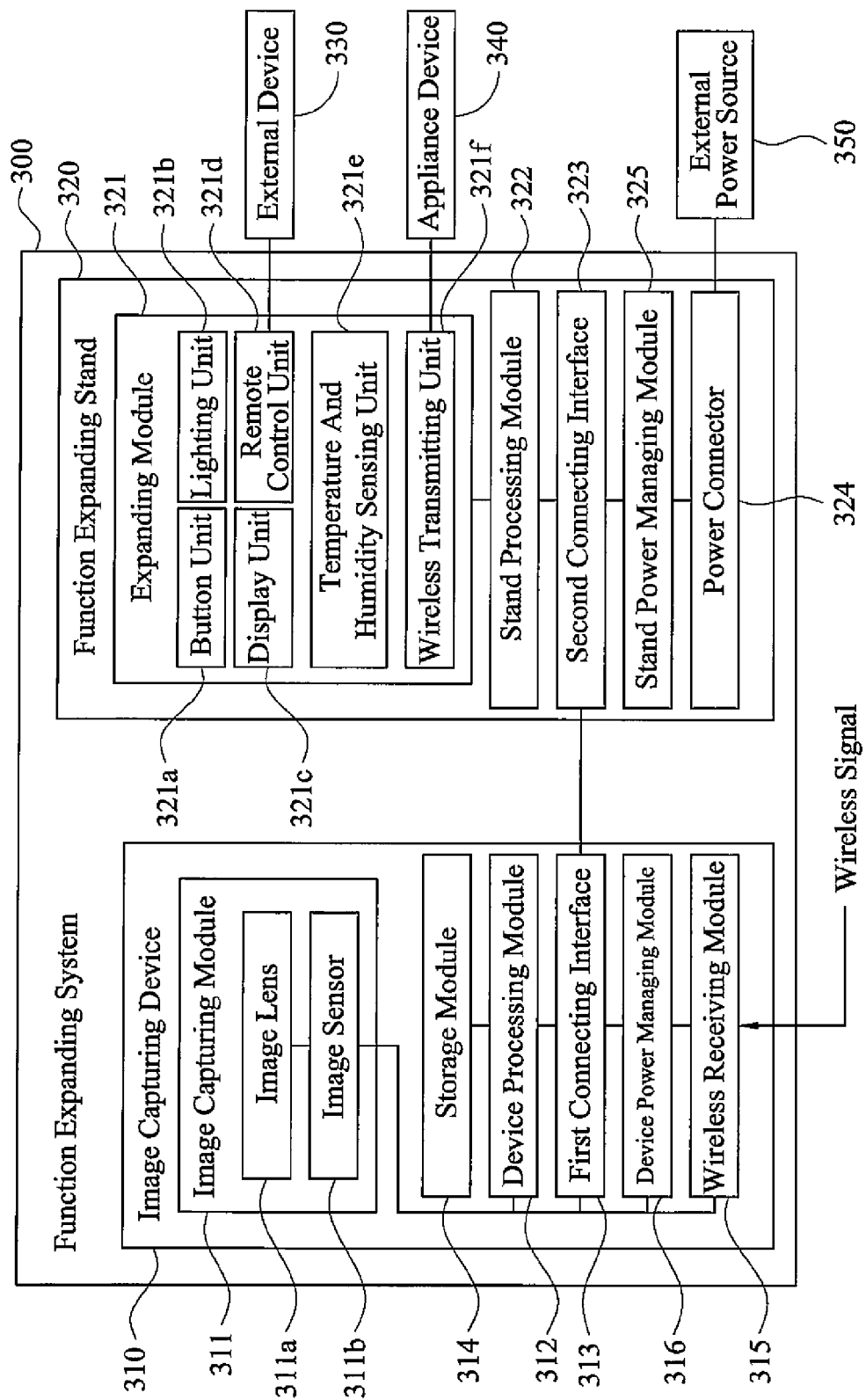
FIG. 3 is a block diagram illustrating the function expanding system according to an embodiment of the invention.

FIG. 3 is a block diagram illustrating the function expanding system according to an embodiment of the invention. As shown in FIG. 3, an image capturing device 310 includes an image capturing module 311, a device processing module 312 and a first connecting interface 313. The device processing module 312 is electrically connected to the image capturing module 311. The first connecting interface 313 is electrically connected to the device processing module 312. The function expanding stand 320 includes a second connecting interface 323, a stand processing module 322 and a function expanding module 321. The first connecting interface 313 is removably connected to the second connecting interface 323. The stand processing module 322 is electrically connected to the device processing module 312 through the first connecting interface 313 and the second connecting interface 323. The function expanding module 321 is electrically connected to the stand processing module 322.

In one embodiment, the first connecting interface 313 has contacts, and the second connecting interface 323 has pins. The number of the contacts is equal to the number of the pins, and the contacts are correspondingly connected to the pins. For example, the second connecting interface 323 includes pogo pins, and the first connecting interface 313 is configured to be connected to the pogo pins in a touching way to achieve transmitting of power and signals between the image capturing device 100 and the function expanding stand 200. The pogo pins are used as pins of the second connecting interface 323. If the second connecting interface 323 has 6 pins, then the first connecting interface 313 has 6 contacts corresponding to the 6 pins.

When the image capturing device 100 is physically connected to the function expanding stand 200, the signals and the power can be transmitted between the image capturing device 100 and the function expanding stand 200 through the pogo pins. When the function expanding stand 200 is connected to a power supply, the image capturing device 100 can even obtain required power from the function expanding stand 200 through the pogo pins so as to operate normally.

For example, the device processing module 312 may be a digital signal processor (DSP) or another processor. The stand processing module 322 may be a micro processor, a control chip, or a similar component.

During operation, in the image capturing device 310, the image capturing module 311 is configured to capture a frame. The device processing module 312 is configured to process image data generated after the image capturing module 311 captures the frame. In particular, when the first connecting interface 313 is connected to the second connecting interface 323, an notification signal and a control signal can be transmitted between the device processing module 312 and the stand processing module 322, such that the function expanding stand 320 can expand functions other than the image capturing device 310. The function expanding module 321 is configured to execute the functions not owned by the image capturing device 310 (e.g., adding a button, receiving a remote control signal, providing a night light, or a liquid crystal display panel), or enable the stand processing module 322 to transmit the notification signal to the device processing module 312 to activate the image capturing module 311 to capture the frame after the function expanding module 321 receives the remote control signal from an external device.

In one embodiment, when the device processing module 312 receives the notification signal of the stand processing module 322, the device processing module 312 activates the image capturing module 310 according to the notification signal to capture the frame and generate the image data. For example, the function expanding stand 320 has a button, and when the button is pressed, the stand processing module 322 transmits the notification signal to the device processing module 312. After receiving the notification signal, the device processing module 312 activates the image capturing module 311 to capture the frame and generate the image data.

In another embodiment, when the device processing module 312 receives the notification signal of the stand processing module 322, the device processing module 312 transmits the control signal to the stand processing module 322 to enable the function expanding module 321 to execute a function according to the control signal. For example, the function expanding stand 320 can receives a remote control signal from a mobile device to enable the image capturing device 310 to activate a function provided by the function expanding stand 320 for turning on/off appliance devices. When the function expanding stand 320 receives the remote control signal from the mobile device, the stand processing module 322 transmits the notification signal to the device processing module 312. After receiving the notification signal, the device processing module 312 transmits the control signal to the stand processing module 322 to activate the function provided by the function expanding stand 320 for turning on/off the appliance devices.

In one embodiment, the image capturing module 311 includes an image lens 311*a* and an image sensor 311*b*. The image lens 311*a* is generally a lens set constituted by one or more pieces of optical glass, in which a basic unit is a concave lens, a multi-surface lens, or a combination thereof. The image sensor 311*b* is configured to capture the frame through the image lens 311*a*, and is a component for converting the frame into image data. The image sensor 311*b* can be charge-coupled device (CCD) or a complementary metal-oxide-semiconductor (CMOS) active pixel sensor. The image sensor 311*b* outputs the image data to the device processing module 312, and enables the device processing module 312 to process the image data.

In one embodiment, the image capturing device 310 further includes a storage module 314. The storage module 314 is electrically connected to the device processing module 312, and is configured to store the image data that has been processed by the device processing module 312. In one implementation, the storage module 314 may be a dynamic random access memory, or a memory block divided from a memory card. After processing the image data generated after the image capturing module 311 captures the frame, the device processing module 312 outputs an image data file to the storage module 314, and the storage module 314 stores the image data file outputted from the device processing module 312.

In one embodiment, the function expanding module 321 is one or a combination of a button unit 321*a*, a lighting unit 321*b*, a display unit 321*c*, a remote control unit 321*d*, a temperature and humidity sensing unit 321*e*, a view angle adjusting unit, and a wireless transmitting unit 321*f*. The button unit 321*a* is at least one button added on the function expanding stand 320 as described above. The user may activate the function expanding stand 320 through the button, so as to transmit the notification signal to the stand processing module 322. The lighting unit 321*b* may be a light-emitting diodes configured to add a lighting function into the function expanding stand 320. For example, when the image capturing device 310 is used as a baby monitor, the lighting unit 321*b* can be used as a night light to assist the image capturing device 310 in capturing the frame. The display unit 321*c* can be a liquid crystal display (LCD) panel configured to add a display function (e.g., displaying the function being executed by the image capturing device 310, a memory usage status of the image capturing device 310, etc.) into the function expanding stand 320. The temperature and humidity sensing unit 321*e* can be a temperature sensor, such as a thermally sensitive resistance (TSR) or a temperature sensing chip, for solely sensing a room temperature. The temperature and humidity sensing unit 321*e* can also be a humidity sensor, such as a capacitance type humidity sensor, for solely sensing humidity. The temperature and humidity sensing unit 321*e* can also be an integrated circuit formed by combining the temperature sensor with the humidity sensor. The view angle adjusting unit can be the tilting motor 220 (shown in FIG. 1), the panning motor 230 (shown in FIG. 1), or a combination thereof to control a view angle of the image capturing device 310 for capturing the frame.

The remote control unit 321*d* can be a receiver (e.g., a bluetooth signal receiver or an infrared signal receiver) to receive a bluetooth signal or an infrared signal from the mobile device or other devices. The wireless transmitting unit 321*f* can be a wireless communication module complying with a Zigbee or Z-wave protocol to execute an appliance automation control. For example, a signal is sent by the wireless transmitting unit 321*f* to remotely control the switching of an appliance device (e.g., an air condition, a fan, or a lamp).

In one embodiment, when the function expanding module 321 is the remote control unit 321*d*, the remote control unit 321*d* receives the remote control signal sent from the external device 330, and the stand processing module 322 transmits the notification signal to the device processing module 312 according to the remote control signal sent from the external device 330. For example, when the remote control unit 321*d* in the function expanding stand 320 receives the remote control signal (e.g., for activating the image capturing module 310 to capture the frame) from the mobile device, the stand processing module 322 transmits the notification signal to the device processing module 312 according to the remote control signal sent from the mobile device. After receiving the notification signal, the device processing module 312 activates the image capturing module 310 to capture the frame.

In one embodiment, the image capturing device 310 further includes the wireless receiving module 315 configured to receive a wireless signal through a network. When the function expanding module 321 is the wireless transmitting unit 321*f*, the wireless receiving module 315 receives the wireless signal through the network. The device processing module 312 transmits the control signal to the stand processing module 322, and the stand processing module 322 activates the wireless transmitting unit 321*f* to control at least one appliance device 340 (e.g., an air condition, a fan, or a lamp). When the wireless receiving module 315 of the image capturing device 310 receives the wireless signal through the network, the user can transmits the wireless signal to the image capturing device 310 from a remote computer device or the mobile device through the network. For example, the user wants to turn on an air condition at home through the network, and he/she can notify the image capturing device 310 having the wireless receiving module 315 through the remote computer device or the mobile device. Then, the device processing module 312 in the image capturing device 310 transmits the control signal to the stand processing module 322, and the stand processing module 322 turns on the air condition through the wireless transmitting unit 321*f*.

In one embodiment, the image capturing device 310 includes the wireless receiving module 315, and the function expanding module 321 is the view angle adjusting unit. When the wireless receiving module 315 of the image capturing device 310 receives the wireless signal through the network, the user can transmit the wireless signal to the image capturing device 310 from the remote computer device or the mobile device through network to drive the view angle adjusting unit to adjust a capturing angle of the image capturing device 310.

In one embodiment when the function expanding module 321 is a combination of the remote control unit 321*d* and the wireless transmitting unit 321*f*, the user can also transmit the remote control signal to the remote control unit 321*d* through the mobile device, and transmit the notification signal to the device processing module 312 through the stand processing module 322. Then, the device processing module 312 transmits the control signal to the stand processing module 322 to enable the wireless transmitting unit 321*f* to control the switching of an appliance device (e.g., an air conditioner, a fan or a lamp).

In one embodiment, the function expanding stand 320 further includes a power connector 324 and a stand power managing module 325. The power connector 324 can be a connector configured to be connected to a power terminal (e.g., 5 volts) and a ground terminal of an external power source 350. The stand power managing module 325 is electrically connected to the power connector 324, the stand processing module 322 and the second connecting interface 323. When the power connector 324 is connected to the external power source 350, the stand power managing module 325 receives and converts electricity of the external power source 350 to the electricity required by the stand processing module 322, such as the electricity required by the stand processing module 322 itself in operation, and the electricity provided by the stand processing module 322 to the function expanding module 321 for operation.

In one embodiment, the image capturing device 310 further includes a device power managing module 316 which is electrically connected to the device processing module 312. When the power connector 324 is connected to the external power source 350, the device power managing module 316 obtains power from the stand power managing module 325 through the first connecting interface 313 and the second connecting interface 323 and provides the power to the device power managing module 316. The device power managing module 316 performs a power management for the image capturing device 310. For example, the device power managing module 316 provides activation electricity of the image capturing device 310. Even if the electricity currently owned by the image capturing device 310 cannot activate the image capturing module 311 to capture the frame, the device power managing module 316 can obtain sufficient electricity from the stand power managing module 325 to activate the image capturing device 310, once the image capturing device 310 is connected to the function expanding stand 320 and the power connector 324 is connected to the external power source 350. Then, the image capturing device 310 can execute its function, or control the function expanding module 320 to execute the function of the function expanding module 321.

Figure 4:
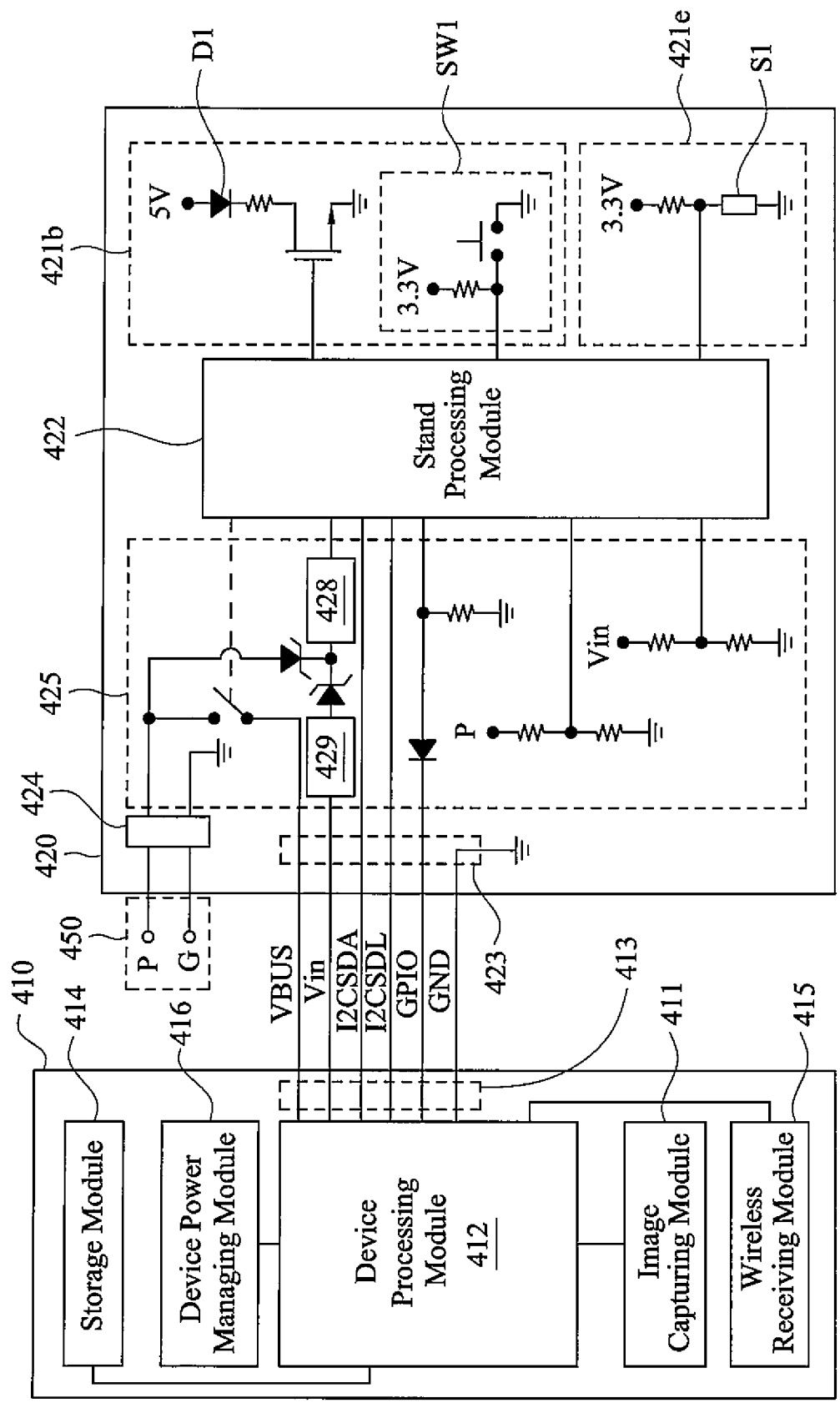
FIG. 4 is schematic circuit diagram illustrating the function expanding system according to an embodiment of the invention.

FIG. 4 is schematic circuit diagram illustrating the function expanding system according to an embodiment of the invention. As shown in FIG. 4, an image capturing device 410 includes an image capturing module 411, a device processing module 412, a first connecting interface 413, a storage module 414, a wireless receiving module 415 and a device power managing module 416. A function expanding stand 420 includes a stand processing module 422, a second connecting interface 423, a power connector 424, and a stand power managing module 425. Since expanded functions of the function expanding stand 420 in FIG. 4 include night lighting and temperature and humidity sensing, the function expanding module further includes a lighting unit 421*b* and a temperature and humidity sensing unit 421*e*. A light-emitting diodes D1 in the lighting unit 421*b* is used as a light source. The light-emitting diodes D1 is switched on/off through a lighting unit switch SW1. A collaboration of software, hardware and firmware can be adopted for implementing the lighting unit switch SW1. The temperature and humidity sensing unit 421*e* includes a temperature and humidity sensor S1, in which the collaboration of software, hardware and firmware can also be adopted to sense temperature and humidity.

The connection between the first connecting interface 413 and the second connecting interface 423 can be implemented through the pogo pins. The second connecting interface 423 has 6 pins, which are a voltage bus VBUS, a connection determination pin Vin, a data bus I2CSDA, a data bus I2CSDL, an interrupt bus GPIO and a ground pin GND. The first connecting interface 413 includes 6 corresponding contacts. When the first connecting interface 413 is connected to the second connecting interface 423, the notification signal and the control signal can be transmitted between the device processing module 412 and the stand processing module 422 through the data bus I2CSDA, the data bus I2CSDL and the interrupt bus GPIO. The stand processing module 422 can transmits power to the device processing module 412 through the voltage bus VBUS. The stand processing module 422 can detect a voltage transmitted from the device processing module 412 to the second connecting interface 423 through the connection determination pin Vin. In addition, a level of the voltage transmitted from the device processing module 412 to the second connecting interface 423 is adjusted by a dc-to-dc converter 429 in the stand power managing module 425.

When the function expanding stand 420 is connected to a power terminal P (e.g., 5 volts) and a ground terminal G of the external power source 450 through the power connector 424, on the one hand, the stand power managing module 425 converts, by a low dropout regulators 428, the received electricity from 5 volts to 3.3 volts that the stand processing module 422 requires. The electricity of 3.3 volts includes electricity required by the stand processing module 422, and electricity required by the lighting unit 421*b*, the lighting unit switch SW1 and the temperature and humidity sensing unit 421*e*; on the other hand, the stand power managing module 425 provides 5 volts to the device power managing module 416 through the voltage bus VBUS to activate the image capturing device 410 with insufficient electricity supplied to the image capturing device 410.

The data buses I2CSDA and I2CSDL are configured to transmit the notification signal and the control signal between the device processing module 412 and the stand processing module 422. The data buses I2CSDA and I2CSDL can be series communication ports (e.g., I2C or SPI). The interrupt bus GPIO is responsible for sending an interrupt signal to the device processing module 412. When the device processing module 412 receives the interrupt signal, the device processing module 412 receives the notification signal sent from the stand processing module 422 through the data buses I2CSDA and I2CSDL.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A function expanding system, comprising:
   an image capturing device, comprising:
      an image capturing module configured to capture a frame;
      a device processing module electrically connected to the image capturing module;
      a first connecting interface electrically connected to the device processing module; and
   a function expanding stand comprising:
      a second connecting interface removably connected to the first connecting interface;
      a stand processing module connected to the second connecting interface; and
      a function expanding module which is electrically connected to the stand processing module, and configured to execute at least one function;
   wherein the device processing module transmits a control signal to the stand processing module to enable the function expanding module to execute the at least one function according to the control signal,
   wherein the image capturing device has a fixed structure, the function expanding stand has a connecting part, the fixed structure is a sliding groove, and a plurality of contacts are disposed on the sliding groove, and
   wherein the image capturing device is physically connected to the function expanding stand by jointing the connecting part with the fixed structure, and the connecting part is physically connected to the fixed structure in a horizontal direction.

2. The function expanding system of claim 1, wherein when the device processing module receives a notification signal of the stand processing module, the device processing module transmits the control signal to the stand processing module according to the notification signal or activates the image capturing module to capture the image.

3. The function expanding system of claim 2, wherein the function expanding module comprises one or a combination of a button unit, a lighting unit, a display unit, a remote control unit, a temperature and humidity sensing unit, a view angle adjusting unit, and a wireless transmitting unit.

4. The function expanding system of claim 3, wherein the function expanding module comprises the remote control unit, the remote control unit receives a remote control signal from an external device, and the stand processing module transmits the notification signal to the device processing module according to the remote control signal.

5. The function expanding system of claim 1, wherein the image capturing device further comprises:
   a wireless receiving module configured to receive a wireless signal through a network,
   wherein the function expanding module comprises a wireless transmitting unit, the wireless receiving module receives the wireless signal through the network, the device processing module transmits the control signal to the stand processing module, and the stand processing module activates the wireless transmitting unit to control at least one appliance device.

6. The function expanding system of claim 1, wherein the image capturing device further comprises:
   a wireless receiving module, configured to receive a wireless signal through a network,
   wherein the function expanding module comprises a view angle adjusting unit, the wireless receiving module receives the wireless signal through the network, the device processing module transmits the control signal to the stand processing module, and the stand processing module drives the view angle adjusting unit to adjust a capture view angle of the image capturing device.

7. The function expanding system of claim 1, wherein the image capturing module comprises:
   an image lens; and
   an image sensor configured to capture the frame through the image lens and to output image data to the device processing module to enable the device processing module to process the image data.

8. The function expanding system of claim 7, wherein the image capturing device further comprises:
   a storage module, which is electrically connected to the device processing module, and is configured to store the image data that has been processed by the device processing module.

9. The function expanding system of claim 1, wherein the first connecting interface comprises the contacts, the second connecting interface comprises a plurality of pins, the number of the contacts is equal to the number of the pins, and the contacts are connected to the pins correspondingly.

10. The function expanding system of claim 1, wherein the function expanding stand further comprises:
   a power connector configured to be connected to an external power source; and
   a stand power managing module electrically connected to the power connector, the stand processing module and the second connecting interface,
   wherein when the power connector is connected to the external power source, the stand power managing module converts electricity of the external power source to provide electricity that the stand processing module requires.

11. The function expanding system of claim 10, wherein the image capturing device further comprises:
   a device power managing module electrically connected to the device processing module,
   wherein when the power connector is connected to the external power source, the device processing module obtains power from the stand power managing module through the first connecting interface and the second connecting interface, the device processing module provides the power to the device power managing module, and the device power managing module performs a power management for the image capturing device.

12. The function expanding system of claim 1, wherein the image capturing device is a digital camera, a digital video recorder, or a surveillance camera.

* * * * *